(12) United States Patent
Khatri et al.

(10) Patent No.: US 9,086,903 B2
(45) Date of Patent: Jul. 21, 2015

(54) MANAGING VIRTUAL HARD DISK SNAPSHOTS

(71) Applicant: INTERNATIONAL BUSINESS MACHINES CORPORATION, Armonk, NY (US)

(72) Inventors: Pralhad M. Khatri, Durham, NC (US); Howard S. Krovetz, Holly Springs, NC (US); Christopher A. Maul, Wake Forest, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 13/737,460

(22) Filed: Jan. 9, 2013

(65) Prior Publication Data

US 2014/0195753 A1  Jul. 10, 2014

(51) Int. Cl.
*G06F 12/00* (2006.01)
*G06F 9/455* (2006.01)
*G06F 12/16* (2006.01)

(52) U.S. Cl.
CPC ........ *G06F 9/45533* (2013.01); *G06F 9/45558* (2013.01); *G06F 12/16* (2013.01); *G06F 2009/4557* (2013.01)

(58) Field of Classification Search
CPC ................................ G06F 12/00; G06F 3/0674
USPC .................... 711/100, 112, 154, 162
See application file for complete search history.

(56) References Cited

U.S. PATENT DOCUMENTS

| 2005/0132346 | A1* | 6/2005 | Tsantilis | 717/168 |
| 2010/0257326 | A1* | 10/2010 | Otani et al. | 711/162 |
| 2011/0265082 | A1 | 10/2011 | Ashok et al. | |
| 2011/0307531 | A1 | 12/2011 | Gaponenko et al. | |

OTHER PUBLICATIONS

Garimella, Neeta, "Understanding and exploiting snapshot technology for data protection, Part 1: Snapshot technology overview"; IBM.com, found on the world wide web at: http://www.ibm.com/developerworks/tivoli/library/t-snaptsm1/index.html.

* cited by examiner

*Primary Examiner* — Tuan Thai
(74) *Attorney, Agent, or Firm* — Paul S. Drake (57) ABSTRACT

A method, system or computer usable program product for managing virtual disk snapshots including utilizing a processor to create multiple disk containers containing multiple snapshots on a host machine persistent memory, and combining the multiple snapshots on a guest operating system to produce a final snapshot utilized by the guest OS as a virtual disk.

21 Claims, 7 Drawing Sheets

| Snapshot Configuration | 470 | Virtual Disk | 475 |
|---|---|---|---|
| Snapshot Assembler | 460 | ST Layer | 465 |
| Guest Operating System | 450 | | |
| Virtual Machine | 440 | | |
| Hypervisor | 430 | Utilities | 435 |
| Host Operating System | 420 | | |
| Physical Hardware | 410 | | |

MANAGING VIRTUAL HARD DISK SNAPSHOTS

BACKGROUND

1. Technical Field

The present invention relates generally to managing virtual hard disk snapshots, and in particular, to a computer implemented method for creating and managing a hypervisor agnostic virtual hard disk.

2. Description of Related Art

Hypervisors may be utilized to provide a virtual environment suitable for allowing multiple operating systems to run on a host system such as a server. A hypervisor, also referred to as a virtual machine manager, provides a virtual machine for each guest operating system, thereby allowing each guest operating system to operate independently of other guest operating systems. Each virtual machine may be allocated an apparent processor, memory, virtual hard disk, and other resources by the hypervisor. Although each guest operating system appears to have the host system processor, memory, hard disk and resources to itself, the hypervisor is actually controlling the host processor(s), memory, hard disk and other resources and allocating what is needed for each guest operating system to operate independently without disrupting each other.

A hypervisor may be a native or bare-metal hypervisor, also known as Type 1, or a hosted hypervisor, also known as Type 2. A bare-metal hypervisor does not require installation of a host operating system. With bare metal virtualization, the hypervisor has direct access to hardware resources which typically results in better performance, scalability and stability. However, with bare metal virtualization, hardware support is typically more limited because the hypervisor may have a limited set of hardware drivers. A hosted hypervisor requires installation of a host operating system. This allows multiple hypervisors to run concurrently on the host operating system. This also generally provides better hardware compatibility than a bare metal hypervisor because the host operating system is responsible for the hardware drivers. However, because a hosted hypervisor does not have direct access to hardware and must go through the host operating system, there is greater overhead which can degrade virtual machine performance. In addition, there may be resource allocation issues due to other hypervisors, services or applications running on the host operating system, further degrading virtual machine performance.

For data protection, a virtual machine may be allocated a snapshot of a virtual hard disk by a hypervisor. A virtual machine snapshot is a file-based image of the state, hard disk data, and configuration of a virtual machine at a specific point in time. The use of a snapshot provides greater data protection and rapid restoration of the virtual hard disk if needed. A snapshot of a virtual machine hard disk can be taken at any time, even while it is running. The virtual machine can then be reverted to a previous state by applying a snapshot of that previous state to the virtual machine.

Figure 1:
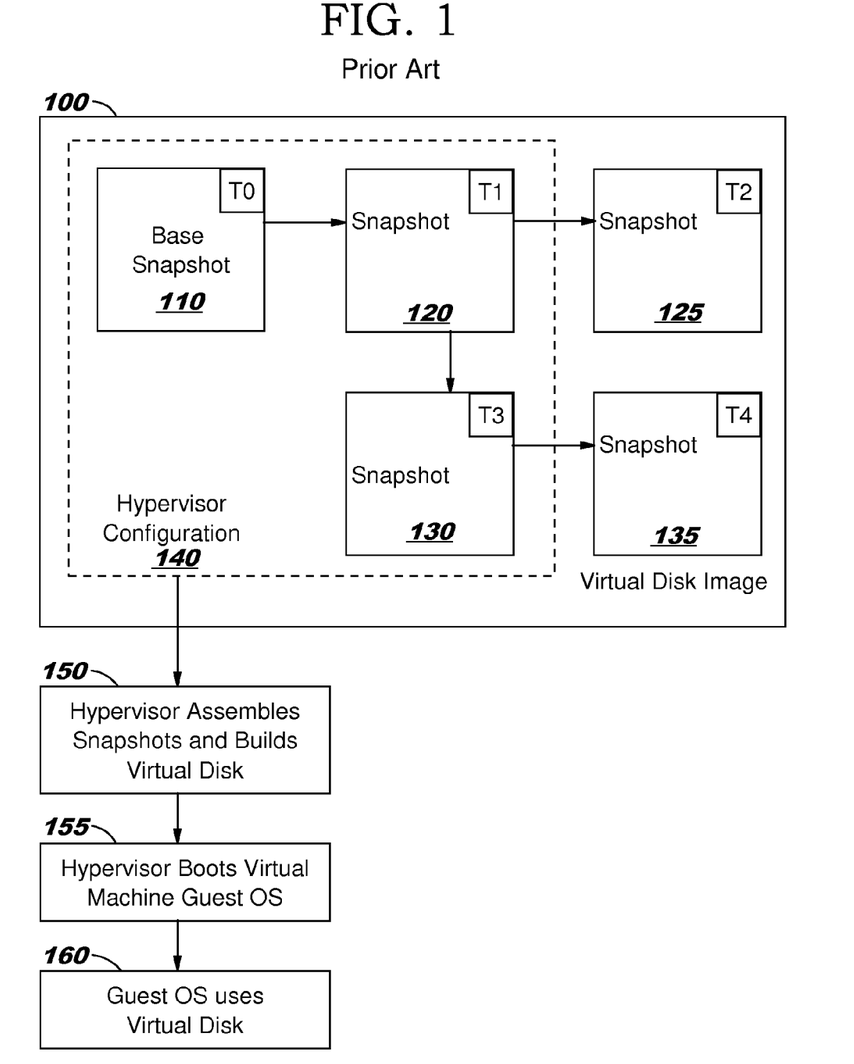
FIG. 1 is a block diagram of multiple snapshots organized as a virtual hard disk in accordance with the prior art.

FIG. 1 is a block diagram of multiple snapshots organized as a virtual hard disk 100 in accordance with the prior art. Multiple snapshots may be organized in a tree structure. A virtual machine may be reverted to an earlier time of processing at the time that a snapshot was generated.

In this example, a base snapshot 110 was generated at time T1. At time T1, a subsequent snapshot 120 is generated. Initially, snapshot 120 may be just a shell if copy-on-write (CoW) snapshot technology is utilized. Other types of snapshot technology may utilize other type of data storage systems. The hypervisor tracks that T1 is a derivative of T1. The manner of this tracking depends on the type of hypervisor. At time T2, another snapshot 125 is generated. The hypervisor tracks that T2 is a derivative of T1 which was a derivative of T1. Subsequent to time T2, a user or other controlling entity returns the virtual machine back to snapshot 120 and starts processing again. Then at time T3, another snapshot 130 is generated. The hypervisor tracks that T3 is a derivative of T1 which was a derivative of T1. Subsequently at time T4, another snapshot 135 is generated. The hypervisor then tracks that T4 is a derivative of T3 which was a derivative of T1 which was a derivative of T0.

In addition to the tracking of the hierarchy of the snapshots, various pointers may be utilized by a snapshot technology (ST) such as copy-on-write (CoW) snapshot technology. For example, in CoW snapshot technology pointers are utilized by a CoW layer to manage the location of data among snapshots. When data in T1 snapshot 120 is being updated (prior to time T2 or time T3), the underlying data may actually be stored back in the base snapshot. As a result, when that underlying data is updated, the underlying data may actually be written to snapshot T1 before writing the updated data to the base snapshot. All of this is managed by an ST layer (CoW in this example) without requiring the intervention or management of the Hypervisor. However, the hypervisor does keep track of the snapshot hierarchy and which snapshot is being utilized at any given time, and that information is provided to the ST layer as needed.

If a user or other controlling entity wants to revert back to snapshot 130, then the hypervisor will generate a configuration 140 based on snapshot 130, snapshot 120 and base snapshot 110. In a first step 150, the hypervisor assembles the snapshots needed (snapshots 110, 120 and 130 in this case) from the tracked snapshot hierarchy and builds a virtual disk based on those snapshots. In a second step 155, the hypervisor boots the virtual machine guest operating system (guest OS). Thirdly, in step 160, the booted guest OS utilizes the virtual disk from step 150 and processing continues.

There are several implementations of snapshot technology (ST) including copy-on-write (CoW), redirect-on-write, split mirror, etc. With copy-on-write, a snapshot is created using only meta-data (i.e. pointers) about where the original data is stored in blocks of virtual disk memory. As a result, no physical copy of the underlying original data is made at snapshot creation. An ST layer invoked by the hypervisor utilizes a set of pointers to track any writes intended for the original data blocks indicated by the meta-data pointers. To prevent overwrites of original data, the data at those original block locations are copied to the appropriate snapshot just before any writes of new data to those block locations are performed. As a result, an original data block is preserved by copy to the appropriate snapshot just prior to new data being written to that original data block, hence the term copy-on-write. A copy-on-write snapshot can be created nearly instantly, but each write to certain data block locations requires two writes, one of the original data to the snapshot and one of the new data to the original data blocks. Redirect-on-write is similar to copy-on-write except the new data to be written is redirected to be written on the snapshot. That is, the new data is stored in the snapshot while the old data continues to be stored in the original location. As a result, only one write is needed when new data is being written. However, the original copy contains the point in time data of the snapshot and the snapshot contains the new data. As a result, this needs to be reconciled, particularly when the snapshot is being deleted. In addition, as multiple snapshots are created, access to the data becomes more complicated, particularly at reconciliation. Split mirror creates a clone copy of the original data in a separate location. While the creation of the split mirror takes time and more space is required, the clone copy is highly available for separate processing. There are other types of snapshots available including different variations of each snapshot technology described above, each with various advantages and disadvantages depending on the application.

It may be desirable to move a virtual machine from one virtual environment (e.g. hypervisor) to another. For example, an enterprise may wish to move a virtual machine from one cloud implementation to a different cloud implementation. However, each virtual environment may utilize a different hypervisor, a different snapshot technology, and a different configuration system for implementing a virtual hard disk. As a result, any snapshot of a virtual hard disk under one hypervisor will need to be processed through a conversion process including mapping differences between the virtual environments before that virtual disk can be used by the virtual machine under a different hypervisor.

SUMMARY

The illustrative embodiments provide a method, system, and computer usable program product for managing virtual disk snapshots including utilizing a processor to create multiple disk containers containing multiple snapshots on a host machine persistent memory, and combining the multiple snapshots on a guest operating system to produce a final snapshot utilized by the guest OS as a virtual disk.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Processes may be performed to create and manage hypervisor agnostic snapshots. These steps may be taken as will be explained with reference to the various embodiments below.

Figure 2:
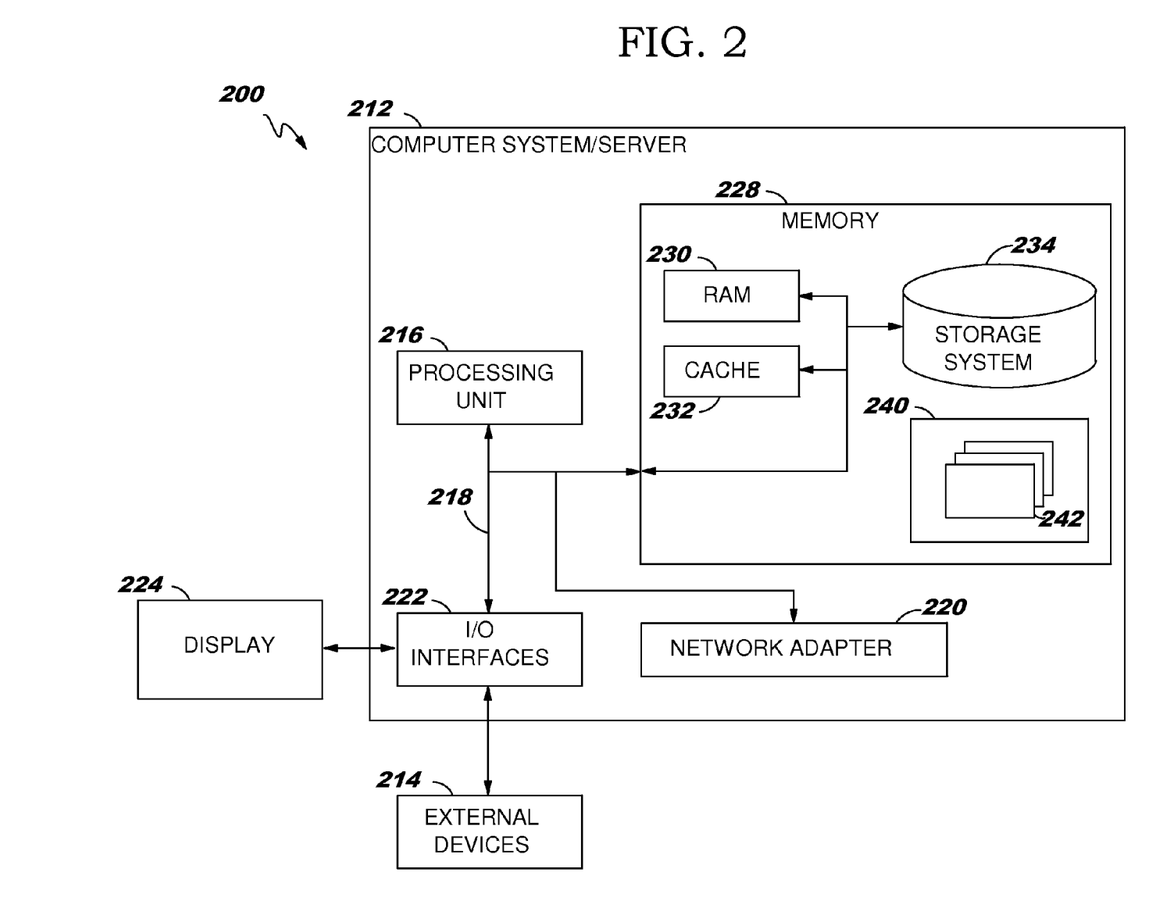
FIG. 2 is a block diagram of a data processing system in which various embodiments may be implemented.

FIG. 2 is a block diagram of a data processing system in which various embodiments may be implemented. Data processing system 200 is one example of a suitable data processing system and is not intended to suggest any limitation as to the scope of use or functionality of embodiments of the invention described herein. Regardless, data processing system 200 is capable of being implemented and/or performing any of the functionality set forth herein.

In data processing system 200 there is a computer system/server 212, which is operational with numerous other general purpose or special purpose computing system environments, peripherals, or configurations. Examples of well-known computing systems, environments, and/or configurations that may be suitable for use with computer system/server 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 212 may be practiced in distributed computing environments where tasks are performed by remote processing devices that are linked through a communications network. In a distributed computing environment, program modules may be located in both local and remote computer system storage media including memory storage devices.

As shown in FIG. 2, computer system/server 212 in data processing system 200 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. Memory 228 may include at least one program product having a set (e.g., at least one) of program modules that are configured to carry out the functions of embodiments of the invention. Memory 228 may also include data that will be processed by a program product.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention. For example, a program module may be operating software for managing applications.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via I/O interfaces 222 through wired connections or wireless connections. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, tape drives, RAID systems, redundant processing units, data archival storage systems, external disk drive arrays, etc.

Figure 3:
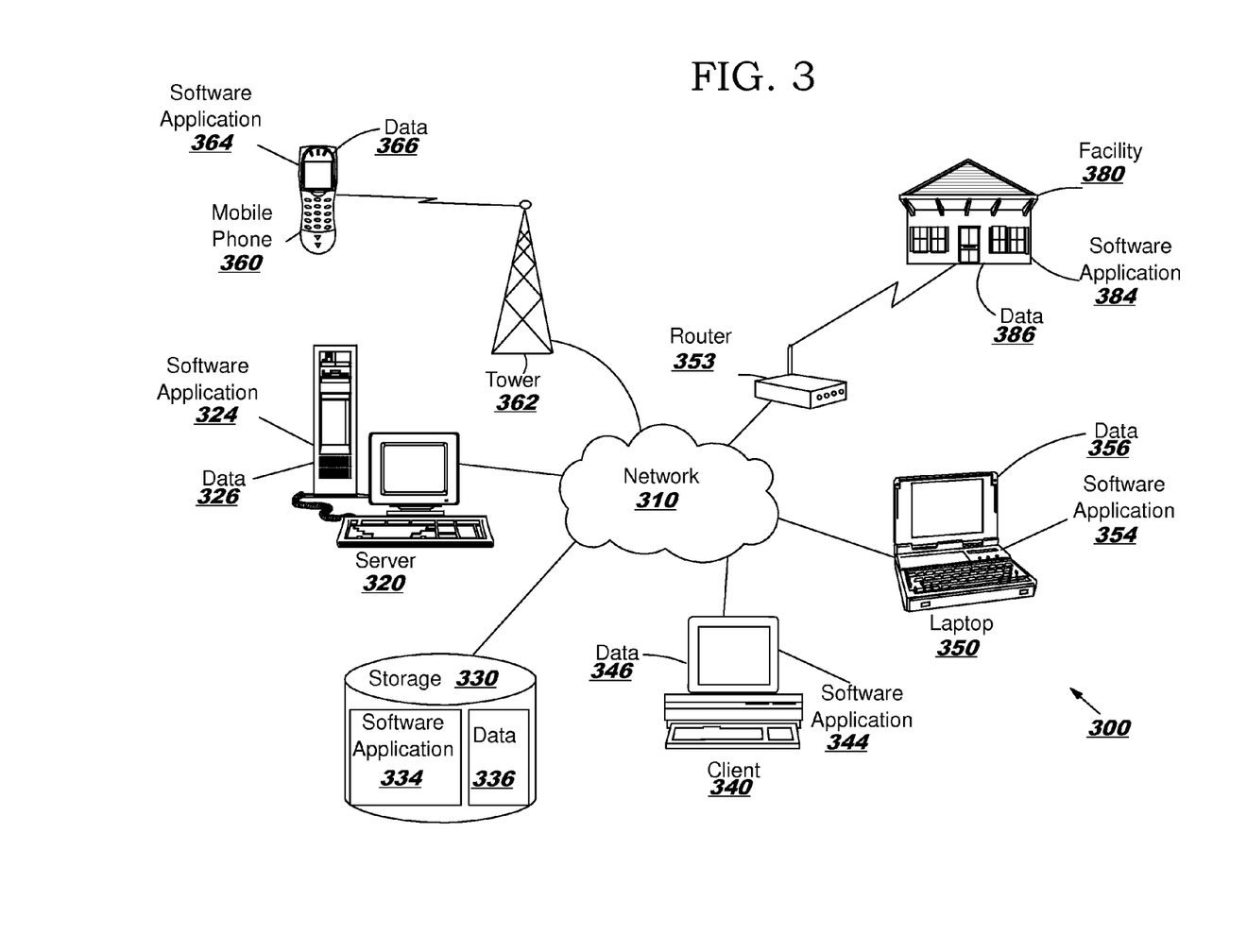
FIG. 3 is a block diagram of a network of data processing systems in which various embodiments may be implemented.

FIG. 3 is a block diagram of a network of data processing systems in which various embodiments may be implemented. Data processing environment 300 is a network of data processing systems such as described above with reference to FIG. 2. Software applications may execute on any computer or other type of data processing system in data processing environment 300. Data processing environment 300 includes network 310. Network 310 is the medium used to provide simplex, half duplex and/or full duplex communications links between various devices and computers connected together within data processing environment 300. Network 310 may include connections such as wire, wireless communication links, or fiber optic cables.

Server 320 and client 340 are coupled to network 310 along with storage unit 330. In addition, laptop 350 and facility 380 (such as a home or business) are coupled to network 310 including wirelessly such as through a network router 353. A mobile phone 360 may be coupled to network 310 through a mobile phone tower 362. Data processing systems, such as server 320, client 340, laptop 350, mobile phone 360 and facility 380 contain data and have software applications including software tools executing thereon. Other types of data processing systems such as personal digital assistants (PDAs), smartphones, tablets and netbooks may be coupled to network 310.

Server 320 may include software application 324 and data 326 for creating and managing snapshots or other software applications and data in accordance with embodiments described herein. Storage 330 may contain software application 334 and a content source such as data 336 for storing snapshot data. Other software and content may be stored on storage 330 for sharing among various computer or other data processing devices. Client 340 may include software application 344 and data 346. Laptop 350 and mobile phone 360 may also include software applications 354 and 364 and data 356 and 366. Facility 380 may include software applications 384 and data 386. Other types of data processing systems coupled to network 310 may also include software applications. Software applications could include a web browser, email, or other software application that can create and manage snapshots.

Server 320, storage unit 330, client 340, laptop 350, mobile phone 360, and facility 380 and other data processing devices may couple to network 310 using wired connections, wireless communication protocols, or other suitable data connectivity. Client 340 may be, for example, a personal computer or a network computer.

In the depicted example, server 320 may provide data, such as boot files, operating system images, and applications to client 340 and laptop 350. Server 320 may be a single computer system or a set of multiple computer systems working together to provide services in a client server environment. Client 340 and laptop 350 may be clients to server 320 in this example. Client 340, laptop 350, mobile phone 360 and facility 380 or some combination thereof, may include their own data, boot files, operating system images, and applications. Data processing environment 300 may include additional servers, clients, and other devices that are not shown.

In the depicted example, data processing environment 300 may be the Internet. Network 310 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 300 also may be implemented as a number of different types of networks, such as for example, an intranet, a local area network (LAN), or a wide area network (WAN). FIG. 3 is intended as an example, and not as an architectural limitation for the different illustrative embodiments.

Among other uses, data processing environment 300 may be used for implementing a client server environment in which the embodiments may be implemented. A client server environment enables software applications and data to be distributed across a network such that an application functions by using the interactivity between a client data processing system and a server data processing system. Data processing environment 300 may also employ a service oriented architecture where interoperable software components distributed across a network may be packaged together as coherent business applications.

Figure 4:
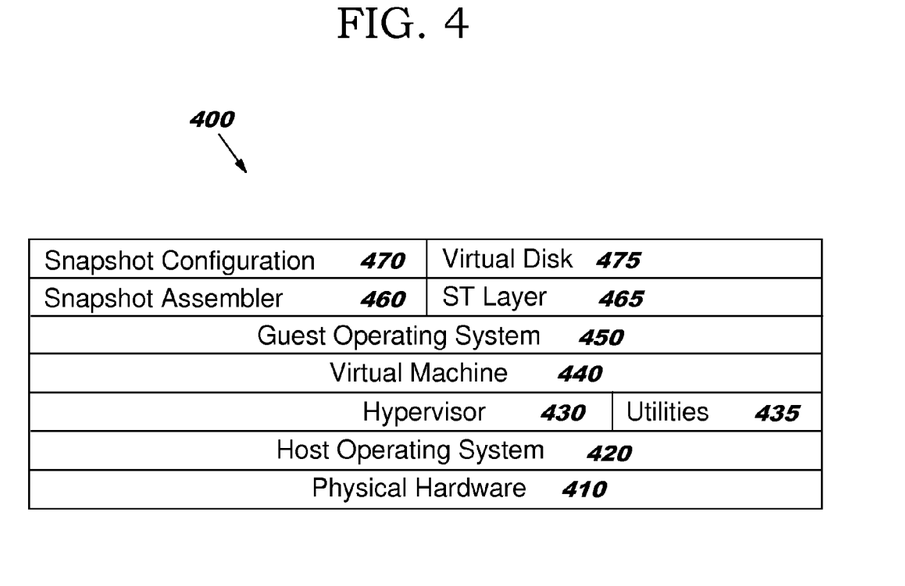
FIG. 4 is a block diagram of a software hierarchy for a data processing system in which various embodiments may be implemented.

FIG. 4 is a block diagram of a software hierarchy for a data processing system in which various embodiments may be implemented. A data processing system 400 may be a single data processing system such as a desktop computer, or it may be a server or a cloud implementation across multiple systems. At a lowest level is the physical hardware 410 including a processor, memory and other devices such as input and output devices. Running on this physical hardware is an optional host operating system 420. The use of a host operating system allows multiple hypervisors to run concurrently. A hypervisor 430 then is above the host operating system. There may be multiple hypervisors for various implementations. A variety of utilities 435 are also available for an administrator or other user to utilize for managing the operations of the hypervisor and the elements running in the hypervisor. These can include device drivers for connecting the hypervisor with physical devices or utilities for configuring virtual machines or virtual disks to be utilized with the hypervisor.

A hypervisor may then create a virtual machine 440. The virtual machine includes an apparent physical processor, memory, hard disk, and other devices for use by software or other applications running on the virtual machine. A guest operating system 450 then runs on the virtual machine. A snapshot assembler 460 and a snapshot technology (ST) layer 465 run on the guest operating system. The snapshot assembler and the ST layer may be modules of the Guest OS. For example, many Linux operating systems include a snapshot technology layer such as copy-on-write (CoW) built into the operating system. The type of snapshot technology utilized may differ depending on the Guest OS. Snapshot assembler 460 may be utilized by the Guest OS to generate a snapshot configuration table 470, and to utilize that configuration to track and manage snapshots to build a virtual disk 475 that is hypervisor agnostic such as described below.

Because the guest OS manages the snapshot assembler and the ST layer, then the resulting virtual disk is hypervisor agnostic. That is, the guest OS may be ported to another hypervisor without modification to the virtual disk, the configuration table, and any ST layer pointers because that information necessary for managing that virtual disk are managed by the guest OS and elements managed by the guest OS.

Each of the layers shown here may include multiple concurrent or sequential implementations. The physical hardware may include multiple data processing systems across a cloud, each data processing system with its own host operating system. Each host operating system may include one or more hypervisors. Each hypervisor may include one or more virtual machines. Each virtual machine may include one or more guest operating systems. Each guest operating system may utilize one or more agnostic snapshots to build a virtual disk. One snapshot assembler may be utilized for managing multiple snapshot configurations for multiple guest operating systems.

Figures 5A, 5B:
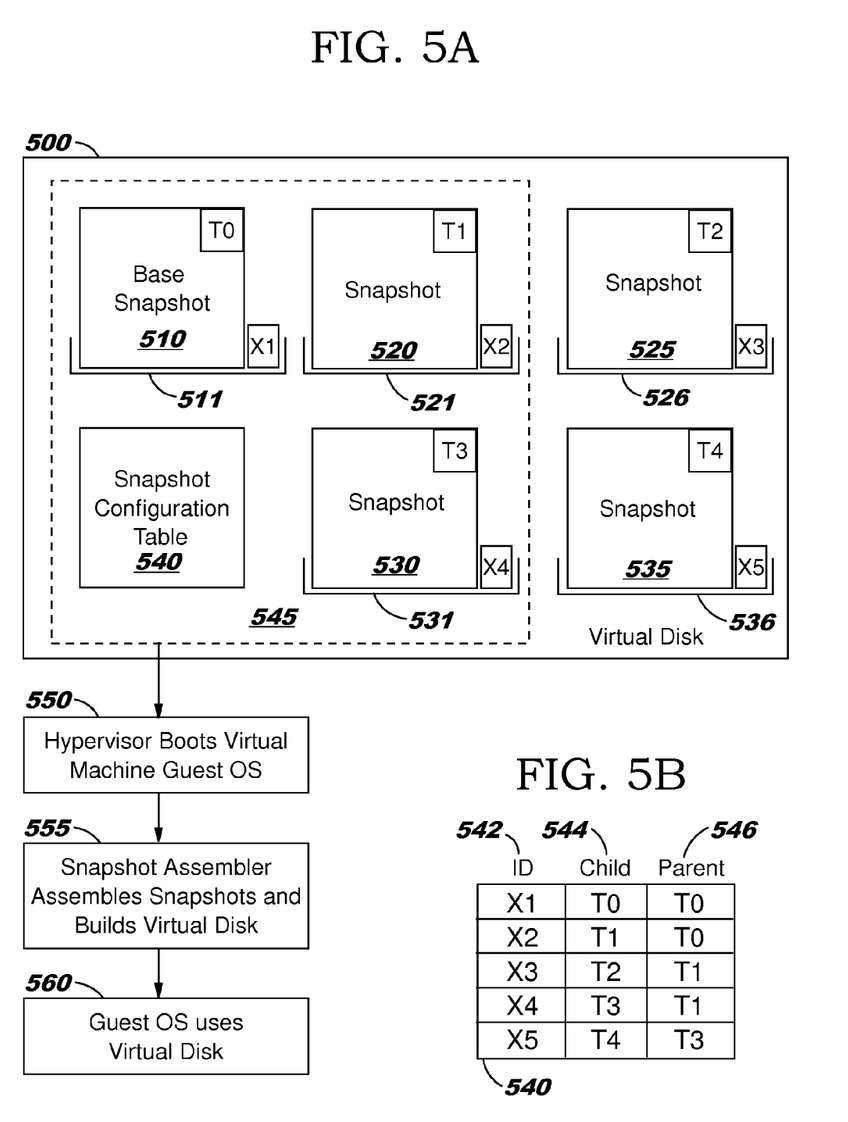
FIGS. 5A and 5B are block diagrams of multiple snapshots organized as a virtual hard disk in which various embodiments may be implemented.

FIGS. 5A and 5B are a block diagrams of multiple snapshots organized as a virtual hard disk 500 in which various embodiments may be implemented. Multiple snapshots may be organized in a tree structure, similar to that shown in FIG. 1, but implemented in a hypervisor agnostic manner. A virtual machine may be reverted to an earlier time of processing at the time that a snapshot was generated. This diagram is based on copy-on-write snapshot technology described above. Alternative snapshot technologies may be implemented differently.

In this example, a base snapshot 510 is generated at time T0 in a snapshot disk container 511 with ID X1 in a process such as described with reference to FIGS. 6A and 6B below. A first entry is stored in a snapshot configuration table 540 (shown in both FIGS. 5A and 5B) with an ID 542, a child 544 and a parent 546 by the snapshot assembler with an ID 542. ID 542 may be a serial number, a pointer, or other means for identifying the snapshot in underlying physical memory, whether that memory is a hard disk or other type of persistent memory. Child 544 and parent 546 are the time ordered snapshot hierarchy with parent being the older snapshot and child the younger snapshot that derives directly from the immediate parent snapshot. The first entry in snapshot configuration table 540 identifies T0 in location X1 as the base snapshot because it is both child 544 and parent 546. At time T1, a subsequent snapshot 520 is generated in a snapshot disk container 521 with ID X2. A second entry is stored in snapshot configuration table 540 by the snapshot assembler showing X2 as the ID, T1 as the child and T0 as the immediate parent. At time T2, another snapshot 525 is generated in a snapshot disk container 526 with ID X3. A third entry is stored in snapshot configuration table 540 by the snapshot assembler showing X3 as the ID, T2 as the child and T1 as the immediate parent. Subsequent to time T2 in this example, a user or other controlling entity returns the virtual machine back to snapshot 520 and starts processing again. Then at time T3, another snapshot 530 is generated in a snapshot disk container 531 with ID X4. A fourth entry is stored in snapshot configuration table 540 by the snapshot assembler showing X4 as the ID, T3 as the child and T1 as the immediate parent. Subsequently, another snapshot 535 is generated at time T4 in a snapshot disk container 536 with ID X5. A fifth entry is stored in snapshot configuration table 540 by the snapshot assembler showing X5 as the ID, T4 as the child and T3 as the immediate parent. Alternatively, snapshot configuration table may include the full ancestry of each child in the parent portion of snapshot configuration table 540.

If a user or other controlling entity wants to revert back to snapshot 530, then in a first step 550 the hypervisor boots the guest operating system. In a second step 555, in response to user input, the snapshot assembler will generate a snapshot configuration 545 based on snapshot 530, snapshot 520, and base snapshot 510 using the hierarchy stored in snapshot configuration table 540 to build a final snapshot to be used as a virtual hard disk by the guest operating system. Thirdly, in step 560, the booted guest OS utilizes the final snapshot in the virtual disk and processing continues. Alternatively, the user may invoke a virtual disk configuration utility outside the hypervisor such as with the host operating system to reconfigure the virtual disk while updating the configuration table, and then booting the guest operating system to implement the new configuration with the snapshot assembler. Such a utility may be aware or not of the guest OS use of a hypervisor agnostic virtual disk, depending on the configuration. Other alternatives may also be utilized.

Figure 6A:
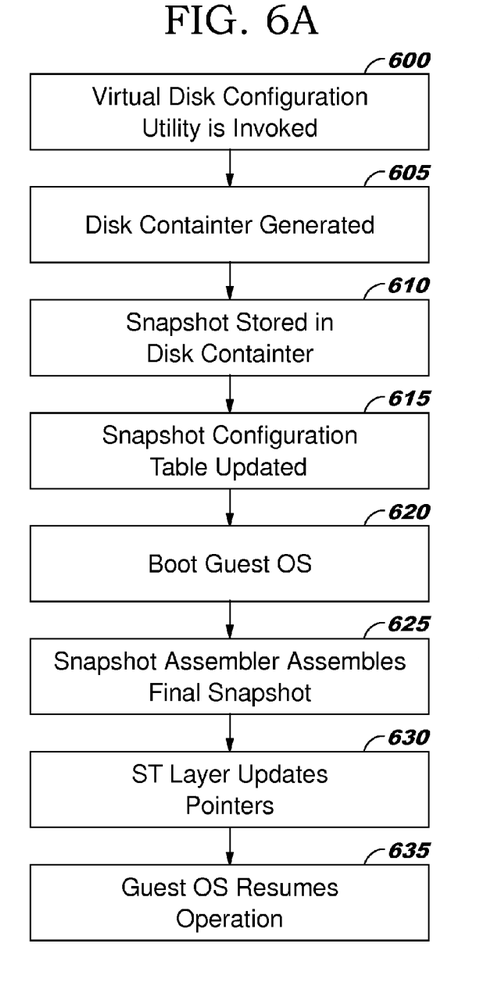
FIGS. 6A and 6B are a flow diagram of creating a new hypervisor agnostic snapshot and a block diagram of an updated snapshot configuration table in which various embodiments may be implemented.
Figure 6B:
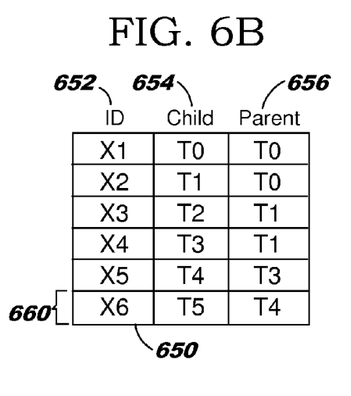

FIGS. 6A and 6B are a flow diagram of creating a new hypervisor agnostic snapshot and a block diagram of an updated snapshot configuration table in which various embodiments may be implemented. In this example, a new snapshot is created at time T5 based as a child of snapshot 535 of FIG. 5A. In a first step 600, a snapshot creation process is initiated by a user invoking a virtual disk configuration utility outside the hypervisor. Such a utility may or may not be aware of the guest OS use of a hypervisor agnostic virtual disk, depending on the configuration. Other alternatives may also be utilized. Alternatively, the utility may be contained within the guest operating system, but will require the reboot of the guest OS before proceeding. In a second step 605, a new disk container suitable for storing a snapshot is generated or otherwise allocated in hard disk memory by the utility. A disk container is space allocated within the physical hard disk for the storage of a snapshot. Enough space should be allocated for usage of the snapshot. Each disk container should hold one snapshot, although multiple snapshots could be allocated to one disk container. As previously described, if copy-on-write snapshot technology is utilized, a new snapshot is just a shell that gets loaded with data over time as data is stored by applications running on the guest operating system. Subsequently in step 610, the utility takes a snapshot of the current state of the virtual disk and adds that to the disk container. In the case of a copy-on-write snapshot technology, the snapshot is simply a shell with pointers to the prior snapshot(s). Then in step 615, the utility adds the new snapshot entry 660 to the snapshot configuration table 650 with T5 as the child 654 and T4 and the parent 656 as shown in FIG. 6B. This would include setting up the snapshot ID 652 (X6 in this example) as a link to the location of the disk container. Alternatively, snapshot ID 652 may be stored in the disk container for identifying its location by inspection. Once the configuration table is updated by the utility, the hypervisor boots the guest operating system in step 620. During boot, in step 625 the guest OS then invokes the snapshot assembler to assemble a final snapshot to be used as the virtual hard disk by utilizing the recently updated snapshot configuration table. In step 630, the ST layer is invoked by the snapshot assembler to reconfigure pointers used by the ST layer based on the updated configuration table information. Once accomplished, then the guest OS is now ready to resume operation with an updated hypervisor agnostic virtual disk in step 635.

Figure 7:
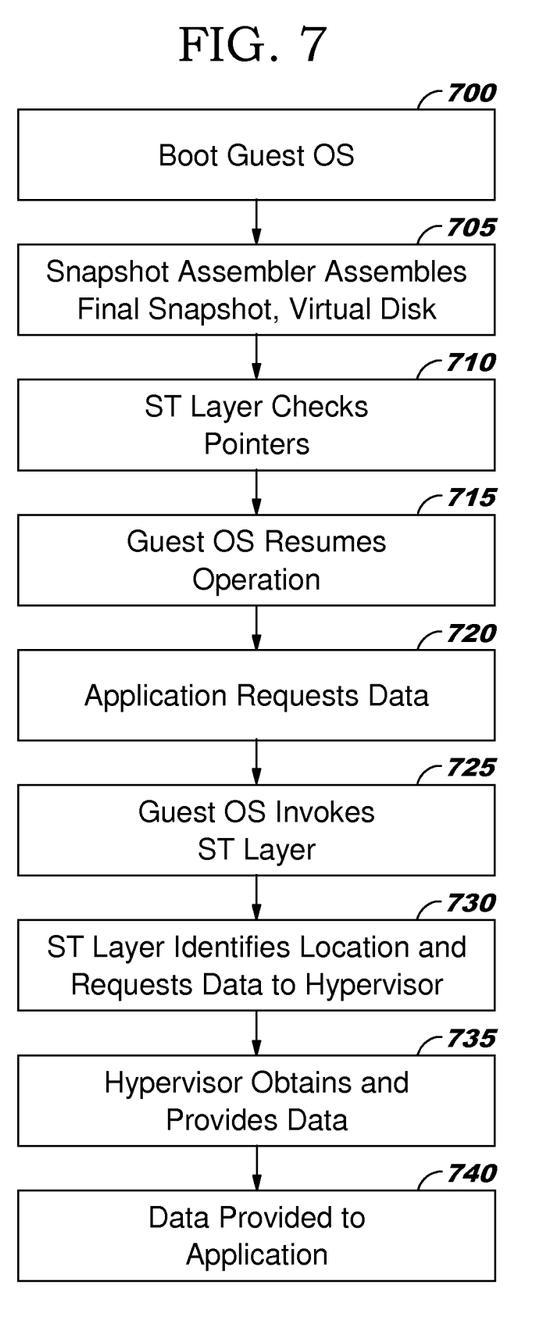
FIG. 7 is a flow diagram of utilizing a hypervisor agnostic virtual disk in which various embodiments may be implemented.

FIG. 7 is a flow diagram of utilizing a hypervisor agnostic virtual disk in which various embodiments may be implemented. In a first step 700 the hypervisor boots the guest OS. During boot in step 705, the guest OS invokes the snapshot assembler to assemble a final snapshot to be used as the virtual disk by utilizing the snapshot configuration table. In step 710, the ST layer is invoked by the snapshot assembler to review and if necessary invoke the ST layer to configure pointers used based on the configuration table (such as described above with reference to FIGS. 6A and 6B). Once accomplished, then the guest OS is now ready to resume operation with a hypervisor agnostic virtual disk in step 715. The guest OS is now ready to resume operation.

In step 720, an application running on the guest OS requests certain data be read from the hard disk. The guest OS receives this request and invokes the snapshot technology (ST) layer to access the requested data in step 725. In step 730, the ST layer reviews the pointers and location of data on the virtual disk and then communicates through the guest OS with the hypervisor to access the requested data. The requested data is then retrieved by the hypervisor and provided through the guest OS to the ST layer in step 735. Once any necessary pointers are updated by the ST layer, then the data is available for the guest OS to pass to the application for processing in step 740.

A write to the virtual disk is handled in essentially the same manner with the ST layer handling the specific details of where data is written based on the type of technology being utilized (e.g. copy-on-write).

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as a guest operating system for creating and managing hypervisor agnostic snapshots. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing virtual disk snapshots comprising:
   utilizing a processor to create multiple disk containers containing multiple snapshots on a host machine persistent memory;
   utilizing a snapshot assembler that utilizes a configuration table to identify the multiple disk containers and the multiple snapshots;
   utilizing a snapshot technology layer that communicates directly with the guest OS and through the guest OS with a hypervisor; and
   invoking the snapshot assembler by the guest OS to combine the multiple snapshots on a guest OS, the snapshot assembler utilizing the configuration table to assemble a final snapshot utilized by the guest OS as a virtual disk.

2. The method of claim 1 wherein each of the disk containers holds a single one of the snapshots.

3. The method of claim 1 wherein the virtual disk is hypervisor agnostic.

4. The method of claim 3 wherein the snapshot assembler is invoked by the guest OS during boot of the guest OS.

5. The method of claim 1 wherein the snapshot technology layer utilizes information from the snapshot configuration table to manage any interaction of the snapshots during reads and writes to the virtual disk.

6. The method of claim 5 wherein the snapshot technology layer is a copy-on-write snapshot technology layer.

7. The method of claim 1 wherein a new disk container is created to contain a new snapshot and wherein the configuration table is updated to instruct the snapshot assembler to produce the final snapshot including the new snapshot.

8. The method of claim 1 wherein each of the disk containers holds a single one of the snapshots; wherein the snapshot technology layer utilizes information from the snapshot configuration table to manage any interaction of the snapshots during reads and writes to the virtual disk; wherein the snapshot technology layer is a copy-on-write snapshot technology layer; and wherein a new disk container is created to contain a new snapshot and wherein the configuration table is updated to instruct the snapshot assembler to produce the final snapshot including the new snapshot.

9. A computer usable program product comprising a non-transitory computer usable storage medium including computer usable code for use in managing virtual disk snapshots, the computer usable program product comprising code for performing the steps of:
   utilizing a processor to create multiple disk containers containing multiple snapshots on a host machine persistent memory;
   utilizing a snapshot assembler that utilizes a configuration table to identify the multiple disk containers and the multiple snapshots;
   utilizing a snapshot technology layer that communicates directly with the guest OS and through the guest OS with a hypervisor; and
   invoking the snapshot assembler by the guest OS to combine the multiple snapshots on a guest OS, the snapshot assembler utilizing the configuration table to assemble a final snapshot utilized by the guest OS as a virtual disk.

10. The computer usable program product of claim 9 wherein each of the disk containers holds a single one of the snapshots.

11. The computer usable program product of claim 9 wherein the virtual disk is hypervisor agnostic.

12. The computer usable program product of claim 11 wherein the snapshot assembler is invoked by the guest OS during boot of the guest OS.

13. The computer usable program product of claim 9 wherein the snapshot technology layer utilizes information from the snapshot configuration table to manage any interaction of the snapshots during reads and writes to the virtual disk.

14. The computer usable program product of claim 13 wherein the snapshot technology layer is a copy-on-write snapshot technology layer.

15. The computer usable program product of claim 9 wherein a new disk container is created to contain a new snapshot and wherein the configuration table is updated to instruct the snapshot assembler to produce the final snapshot including the new snapshot.

16. A data processing system for managing virtual disk snapshots, the data processing system comprising:
   a processor; and
   a persistent memory storing program instructions which when executed by the processor execute the steps of:

utilizing the processor to create multiple disk containers containing multiple snapshots on the data processing system persistent memory;

utilizing a snapshot assembler that utilizes a configuration table to identify the multiple disk containers and the multiple snapshots;

utilizing a snapshot technology layer that communicates directly with the guest OS and through the guest OS with a hypervisor; and invoking the snapshot assembler by the guest OS to combine the multiple snapshots on a guest OS, the snapshot assembler utilizing the configuration table to assemble a final snapshot utilized by the guest OS as a virtual disk.

17. The data processing system of claim 16 wherein each of the disk containers holds a single one of the snapshots.

18. The data processing system of claim 16 wherein the virtual disk is hypervisor agnostic.

19. The data processing system of claim 18 wherein the snapshot assembler is invoked by the guest OS during boot of the guest OS.

20. The data processing system of claim 16 wherein the snapshot technology layer utilizes information from the snapshot configuration table to manage any interaction of the snapshots during reads and writes to the virtual disk.

21. The data processing system of claim 16 wherein a new disk container is created to contain a new snapshot and wherein the configuration table is updated to instruct the snapshot assembler to produce the final snapshot including the new snapshot.

* * * * *